(12) United States Patent
Hasegawa et al.

(10) Patent No.: US 7,567,910 B2
(45) Date of Patent: Jul. 28, 2009

(54) METHOD OF VALIDATING ENTRANCE TO EVENT SITE

(75) Inventors: Yutaka Hasegawa, Hamamatsu (JP); Shinji Koezuka, Hamamatsu (JP); Nobuo Tsunashima, Hamamatsu (JP); Masaya Okura, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 702 days.

(21) Appl. No.: 09/963,859

(22) Filed: Sep. 25, 2001

(65) Prior Publication Data

US 2002/0040308 A1     Apr. 4, 2002

(30) Foreign Application Priority Data

Sep. 29, 2000    (JP)  ............................ 2000-299159

(51) Int. Cl.
*G06F 19/00* (2006.01)
*G06F 17/60* (2006.01)
*H04Q 7/24* (2006.01)
*G07F 17/42* (2006.01)

(52) U.S. Cl. .................. 705/1; 705/5; 705/26; 705/39; 705/64; 705/67; 235/382; 235/384; 340/825

(58) Field of Classification Search ...................... 705/1, 705/5, 26, 39, 64, 67; 235/382, 384; 340/825
See application file for complete search history.

(56) References Cited

U.S. PATENT DOCUMENTS

| 5,754,654 | A | * | 5/1998 | Hiroya et al. | .................. 705/76 |
| 6,058,381 | A | * | 5/2000 | Nelson | .................. 705/40 |
| 6,175,922 | B1 | * | 1/2001 | Wang | .................. 713/182 |
| 6,223,166 | B1 | | 4/2001 | Kay | |
| 6,299,062 | B1 | * | 10/2001 | Hwang | .................. 235/379 |
| 6,496,809 | B1 | * | 12/2002 | Nakfoor | .................. 705/80 |
| 6,634,550 | B1 | * | 10/2003 | Walker et al. | .................. 235/383 |

FOREIGN PATENT DOCUMENTS

| JP | 11-184935 | | 7/1999 |
| WO | WO 00/03328 | * | 1/2000 |

OTHER PUBLICATIONS

PC Magazine May 23, 2000 (see attached).*
PC Mag/REGISOFT support.*
Microsoft Press Computer Dictionary; Definition of executable attached.*
PC Magazine, May 23, 2000; p. 80; Carol Levin.*
REGISOFT support; found on wayback machine on www.regisoft.com; Jun. 2, 2005; pp. 1-6.*
Microsoft Press Computer Dictionary Third Edition; by Harry Newton; 2004; Definition of executable attached, p. 182-183.*
High Tech News; Ella Jacoby; Israel Co Regisoft Among Most Promising at ComDex 99; Nov. 22, 1999, 2 pgs.*

* cited by examiner

*Primary Examiner*—John G. Weiss
*Assistant Examiner*—Matthew L. Brooks
(74) *Attorney, Agent, or Firm*—Morrison & Foerster LLP (57) ABSTRACT

A method is designed for validating an entrance to an event site. The method is carried out by the steps of accessing to a ticket issue server through a network by a portable terminal device to request an issue of ticket data, accepting a request of the ticket data at the ticket issue server and transmitting the ticket data in place of a physical ticket to the portable terminal device in response to the request, and receiving the ticket data by the portable terminal device to reproduce the ticket data in a visible or audible form at the event site for validating of the entrance to the event site.

2 Claims, 6 Drawing Sheets

| MusicFront Ticket Center |
|---|
| Enter your registration ID and password and clic Enter button |
| ID [ ] |
| PWD [ ] |
| ENTER |

| Welcome! MusicFront Ticket Center |
|---|
| Next MusicFrront live concert will be held on the first of December at Tokyo YAMAHA Hall. If you want to get the ticket, click Ticket button. We will send you the ticket URL and password later by mail. |
| TICKET |

| E-MAIL |
|---|
| FROM : MusicFront |
| We are MusicFront Ticket Center. Thank you very much for your reservation of the ticket of the December 1 Live concert. Your ticket URL and password are as follows : |
| [Ticket URL] |
| http : //abcd.mf.com |
| [Password] |
| mf12011234 |

| MusicFront Live 2000 12 01 |
|---|
| Enter your password and click Enter button. |
| PWD [ ] |
| ENTER |

METHOD OF VALIDATING ENTRANCE TO EVENT SITE

BACKGROUND OF THE INVENTION

1. Field of the Invention

The present invention relates generally to a personal authentication method using a portable terminal such as a mobile telephone and, more particularly, to an admission authentication method and system for authenticating the admission to event sites such as concert halls.

2. Description of Related Art

In order to attend events such as concerts, would-be visitors must directly get tickets sold or distributed at event sites or from ticket agencies, or must order tickets to these institutions by telephone or mail.

On the other hand, a system for checking the admission to an event site by use of a portable terminal device without use of physical tickets is disclosed in Japanese Published Unexamined Patent Application No. Hei 11-184935. In the disclosed method, a person who wants to get an airline ticket makes a reservation of the ticket at an airline company from the mobile telephone via a reservation company. If the ticket can be reserved, the information about the reservation is registered with a flight reservation data file and, at the same time, the information is sent to the mobile telephone by which the application for this reservation has been made and stored. At admission checking, a signal is sent from the portable terminal device to a server which stores the reservation information, upon which the server checks the reservation status, thereby permitting the admission of the user of the portable terminal device.

However, the first-mentioned method in which users get physical tickets presents a problem of cumbersome procedures for ticket acquisition. Besides, event managers or promoters must take the cost of ticket printing, sale, and distribution into account. The second-mentioned disclosed technology must execute authentication processing between a portable terminal device and a server at the time of admission checking, thereby presenting problems of having to prepare necessary authentication programs and to execute the authentication processing which requires, at the time of admission checking, comparatively large amounts of computational resources.

SUMMARY OF THE INVENTION

It is therefore an object of the present invention to provide an admission authentication method and system which allows users to reserve the admission to events without getting physical tickets which would be cumbersome for the users to do and, at the same time, allows managers of events to save the labor and cost, which would be otherwise incurred. Another object is to provide an admission authentication method and system for facilitating admission checking.

In one aspect of the invention, a method of validating an entrance to an event site comprises the steps of accessing to a ticket issue server through a network by a portable terminal device to request an issue of ticket data, accepting a request of the ticket data at the ticket issue server and transmitting the ticket data in place of a physical ticket to the portable terminal device in response to the request, and receiving the ticket data by the portable terminal device to reproduce the ticket data in a visible or audible form at the event site for validating of the entrance to the event site.

In another aspect of the invention, a method of validating an entrance to an event site comprises the steps of accessing to a reception server through a network by a portable terminal device to request an issue of ticket data (step 602 of FIG. 6), transmitting a mail containing a password and an address of a ticket issue server to the requesting portable terminal device from the reception server (step 604), receiving the mail by the portable terminal device and addressing the ticket issue server according to the address contained in the received mail and inputting the password contained in the received mail to thereby gain an access to the ticket issue server (step 606), transmitting the ticket data in lieu of a physical ticket to the requesting portable terminal device from the ticket issue server upon confirmation of the inputted password (step 608), and receiving the ticket data by the portable terminal device to reproduce the ticket data in a visible or audible form at the event site for validating of the entrance to the event site (step 612).

Preferably, in these inventive methods, the ticket data is visibly reproduced in the form containing at least one of a predetermined graphic, predetermined character strings and a bar code on a display of the portable terminal device. In such a case, the ticket data contains script information effective to specify a display mode of the ticket data when the ticket data is visibly reproduced on the display of the portable terminal device. The inventive methods may further comprise the step of reading the ticket data visibly reproduced on the display for confirming whether or not the ticket data is authentic.

In a further aspect of the invention, a system comprises a ticket issue server and a portable terminal device connected to the ticket issue server through a network for validating an entrance to an event site, wherein the portable terminal device comprises an accessing section that is operated to access to the ticket issue server through the network to make a request for an issue of ticket data, a receiving section that receives the ticket data from the ticket issue server, and an output section that reproduces the ticket data by a visible or audible form at the event site in place of a physical ticket for validating of the entrance to the event site, and wherein the ticket issue server comprises an accepting section that accepts the request from the portable terminal device for issuing the ticket data, and a transmitting section that transmits the ticket data through the network in place of a physical ticket to the portable terminal device in response to the request.

Alternatively, an inventive system comprises a ticket issue server, a reception server and a portable terminal device connected to the ticket issue server and the reception server through a network for validating an entrance to an event site. The portable terminal device comprises an accessing section that is operated to access to the reception server through the network to make a request for an issue of ticket data, a first receiving section that receives a mail containing a password and an address of the ticket issue server from the reception server, an addressing section that addresses the ticket issue server according to the address contained in the received mail for inputting the password contained in the received mail to thereby gain an access to the ticket issue server, a second receiving section that receives the ticket data from the ticket issue server, and an output section that reproduces the ticket data by a visible or audible form at the event site in place of a physical ticket for validating of the entrance to the event site. The reception server comprises a transmitting section that transmits the mail containing the password and the address of the ticket issue server to the portable terminal device in response to the request from the portable terminal device. The ticket issue server comprises a transmitting section that transmits the ticket data in lieu of a physical ticket to the portable terminal device upon confirmation of the inputted password.

Preferably, in these inventive systems, the portable terminal device comprises the output section that visibly reproduces the ticket data in the form containing at least one of a predetermined graphic, predetermined character strings and a bar code. In such a case, the ticket issue server issues the ticket data that contains script information effective to specify a display mode of the ticket data when the ticket data is visibly reproduced on a display of the portable terminal device. These inventive systems may further comprise a reading device that is provided at the event site and that reads the ticket data visibly reproduced on a display of the portable terminal device for confirming whether or not the ticket data is authentic.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings. Now, referring to FIG. 1, a network infrastructure 100 such as the Internet is connected to an ticket issue server 101, a user terminal device 102, a terminal relay station 104, a credit card company or bank system 105, and an event site management terminal 106 in a mutually communicable manner. The ticket issue server 101 is provided by the event manager or promoter, and has a registrant database (DB) 111, a Web page HTML document group 112, and ticket data 113. The registrant DB 111 stores user information for identifying users qualified for receiving tickets by use of the subject system (for example, user name, telephone number, registration password, and mail address). Each piece of information stored in the registrant DB 111 is searchable by search keys. The registrant DB 111 may additionally store user's bank account number, access frequency, and usage log.

Figure 1:
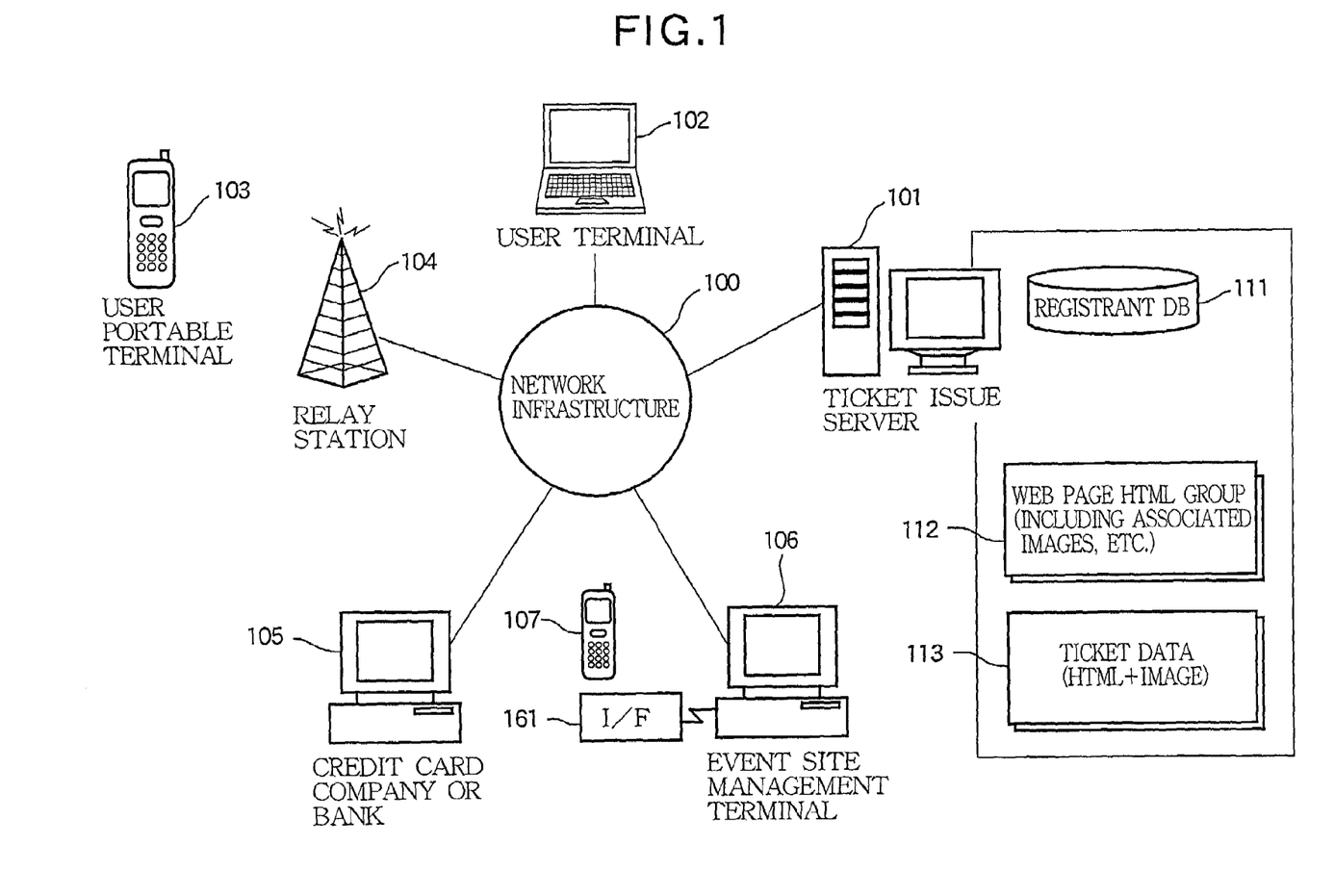
FIG. 1 is a schematic diagram illustrating an admission authentication system for practiced as one embodiment of the invention which authenticates the admission to event sites.

The user accesses the ticket issue server 101 from the user terminal 102 or the user mobile terminal 103 via the network 100. The user portable terminal 102 and the user mobile terminal 103 are of a portable type which the user can carry to event sites. In response to the access from the user, the ticket issue server 101 references the registrant DB 111 to check whether that access is placed by a registered user. If the access is made from the registered user, then the ticket issue server 101 sends display data to the accessing terminal 101 or 103 to execute a predetermined display operation. The Web page HTML document group 112 consists of HTML documents, and is sent to the terminal 102 or 103 on demand basis. Through the transfer of these document data, the terminal 102 or 103 requests the ticket issue server 101 for the issuance of ticket data. In response, the ticket issue server 101 sends ticket data 113 to the requesting terminal 102 or 103. The ticket data 113 is an HTML document which includes images for example. This HTML document is displayed on the terminal 102 or 103, thereby causing the displayed HTML document as a ticket which allows the user to attend an event.

The terminal 102 or 103 displays the ticket data supplied from the ticket issue server 101 in a predetermined manner. For example, the ticket data basically includes script information for defining a display mode, and is displayed by the script such as HTML. Checking the displayed information, the event management authenticates the user of the terminal, who owns the ticket for the event.

The credit card company or bank system 105 executes fee-charging for pay services and ticket price settlement processing by online. The event site management terminal 106 is arranged when the user authentication is performed between the user portable terminal 107 and the event management. The event site management terminal 106 and the ticket issue server 101 may be combined. An interface (I/F) 161 retrieves information necessary for authentication from the portable terminal 107 by use of any of various code readers or image input devices for capturing the information displayed on the portable terminal 107 or by use of a direct communication device such as infrared I/F or wireless I/F.

Figure 2A:
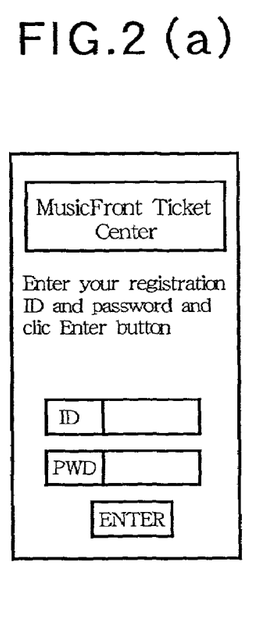
FIGS. 2(a) through 2(f) illustrate display screens to be displayed on a monitor at the acquisition of ticket data.
Figure 3:
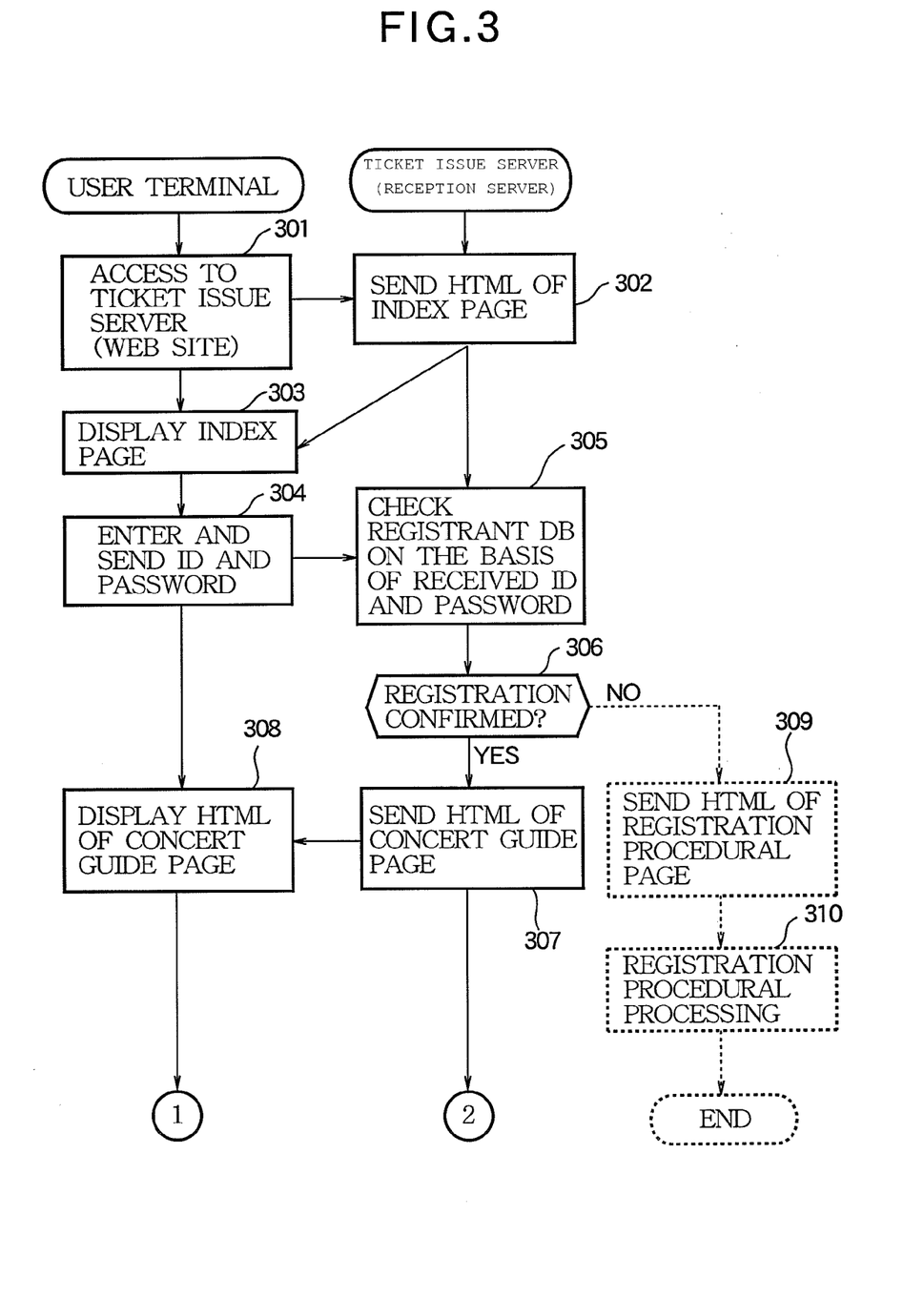
FIG. 3 is a flowchart describing a processing procedure to be executed at the acquisition of ticket data.
Figure 4:
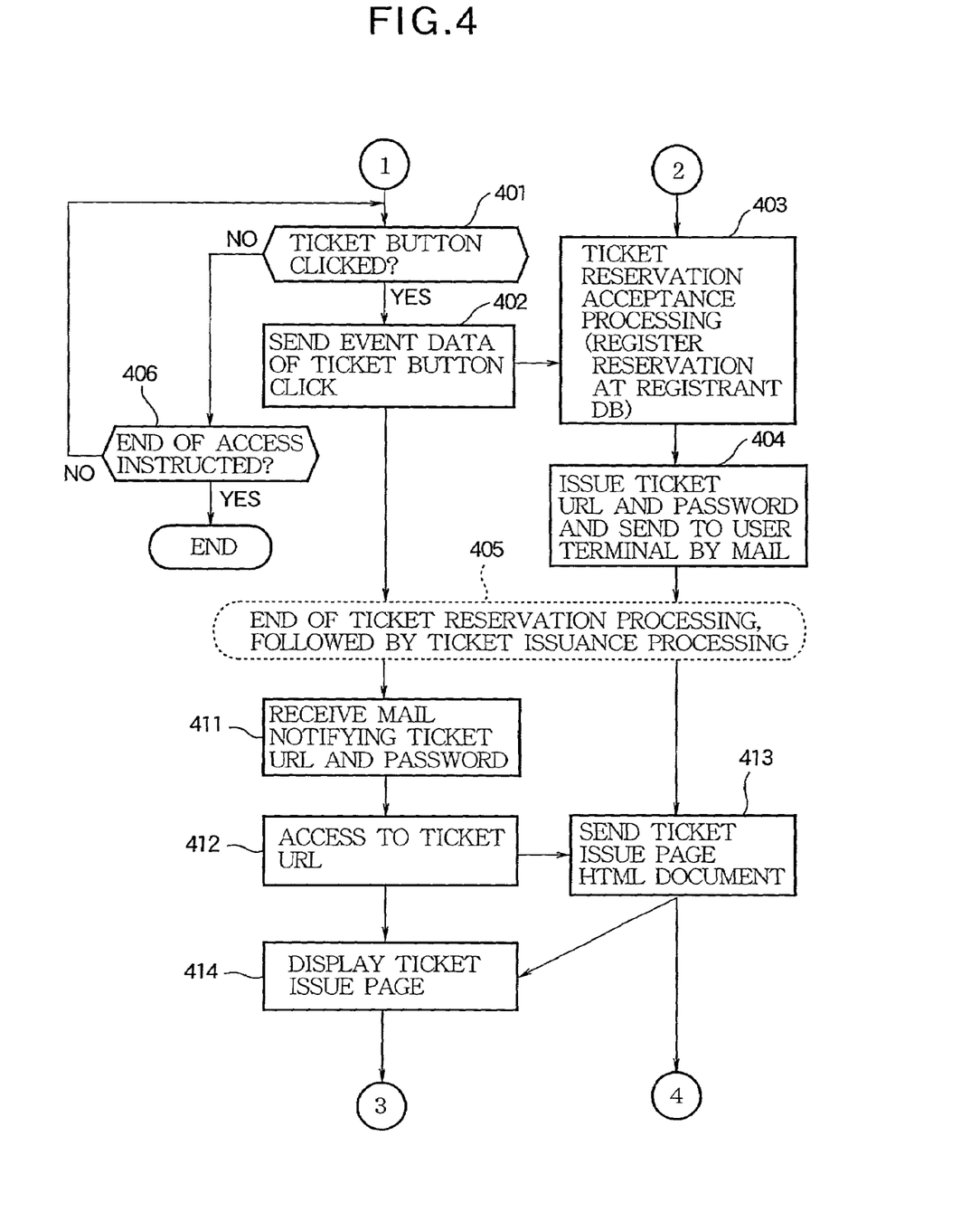
FIG. 4 is a flowchart continued from the flowchart of FIG. 3.
Figure 5:
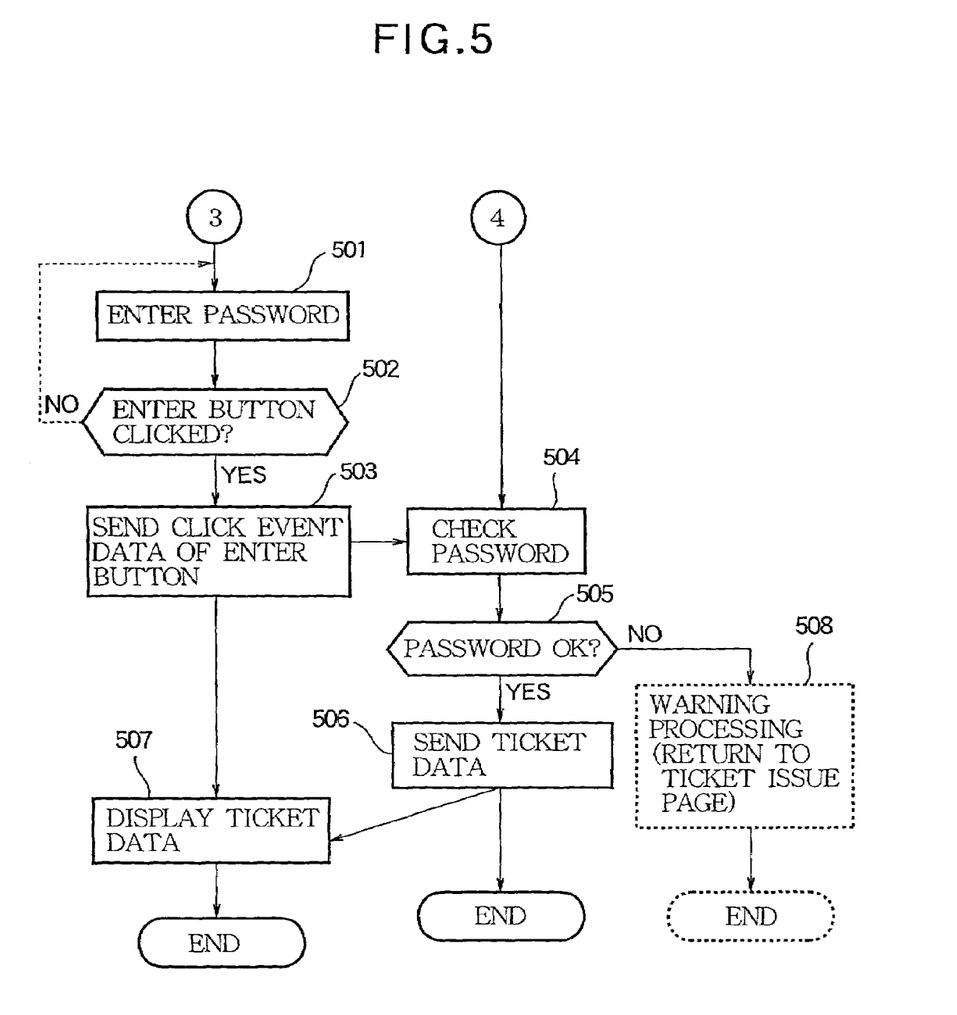
FIG. 5 is a flowchart continued from FIG. 4.

FIGS. 2(a) through 2(f) show exemplary display screens to be displayed when the user acquires the ticket data, which is the authentication data replacing conventional physical tickets, by means of the portable terminal 103 based on the embodied system. FIGS. 3 through 5 illustrate the processing procedures to be executed for the ticket data acquisition. The following describes the procedures for acquiring ticket data, which is the authentication information for event site admission, by means of the portable terminal 103 of the user, with reference to these drawings.

Referring to FIG. 3, first, the user portable terminal 103 accesses to the ticket issue server (or Web site) 101 in step 301. In response, the ticket issue server 101 sends an index page HTML document to the user portable terminal 103 in step 302. In step 303, the user portable terminal 103 displays the received index page. FIG. 2(a) shows the index page to be displayed first for example. This screen prompts the user to enter his registration ID and password, and to press the Enter button on the portable terminal.

In step 304, the user portable terminal 103 is operated to input the registration ID and password of the user from the monitor screen shown in FIG. 2(a), and to send them to the ticket issue server 101. In step 305, the ticket issue server 101 searches, on the basis of the received user registration ID and password, the registrant DB 111 for checking of the user. In step 306, the ticket issue server 101 determines whether the registration of the user has been confirmed. If the user is not found in the registrant DB 111, then the ticket issue server 101 sends an HTML document of a registration procedure page to the user portable terminal 103. In step 310, the ticket issue server executes registration procedure processing. If the user is found in the registrant DB 111 in step 306, the ticket issue server 101 sends an HTML document of a concert guide page to the user portable terminal 103 in step 307. In step 308, the user portable terminal 103 displays the received concert guide page.

Figure 2B:
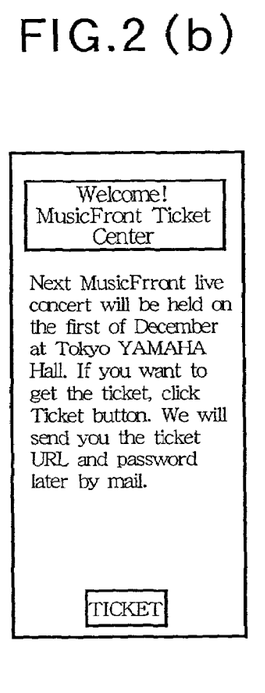

FIG. 2(b) shows an exemplary concert guide page displayed in step 308. This page shows a guide or announcement for a next live convert. If the user wants to buy the ticket for the announced concert, the user presses the TICKET button shown on this page. It is also practicable that the concert guide page may display a plurality of concerts, from which the user selects desired one. In this case, the ticket for the selected concert is issued by the ticket data issue processing to be described later.

After step 308, the user portable terminal 103 determines in step 401 whether the TICKET button has been pressed. If the TICKET button has not been pressed, the user portable terminal 103 determines in step 406 whether an access end operation has been performed by the user. If the determination is YES, the user portable terminal 103 ends the processing. If the determination is NO, the user portable terminal 103 executes processing corresponding to a predetermined operation as required, and returns to step 401. If the TICKET button is pressed in step 401, then the user portable terminal 301 sends operational event data indicative of the TICKET button operation to the ticket issue server 101 in step 402.

In step 403, the ticket issue server 101 executes ticket reservation acceptance processing in accordance with the operational event data. This processing includes the registration of the reservation at the registrant DB 111. In step 404, the ticket issue server 101 issues the ticket URL and the password, and mails them to the applicant having the user terminal. After step 402, the user portable terminal 103 has completed the ticket reserving operation and therefore may be powered off. After step 404, the ticket issue server 101 disconnects from the user portable terminal 103, upon which the ticket reservation acceptance processing comes to an end.

In step 411, the user portable terminal 103 receives the mail sent from the ticket issue server 101 in step 404. In step 412, the user of the portable terminal 103 accesses to the supplied ticket URL. In step 413, the ticket issue server 101 sends an HTML document of a ticket issue page, which is the content of the ticket URL, to the user portable terminal 103 in step 413. In step 414, the user portable terminal 103 displays the supplied ticket issue page.

Figure 2C:
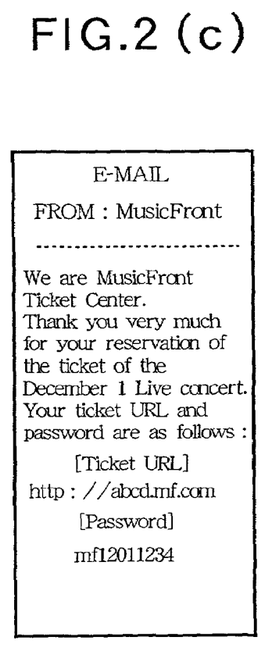
Figure 2D:
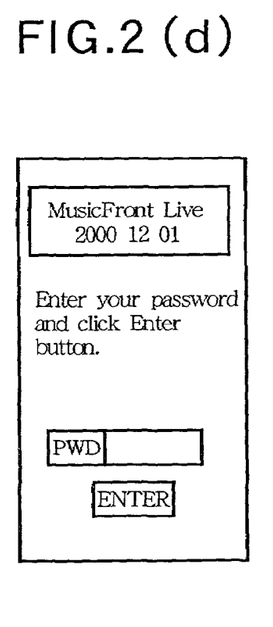

FIG. 2(c) shows an exemplary mail message notifying the ticket URL and password received in step 411. Checking this mail message, the user accesses to the supplied ticket URL in step 412. FIG. 2(d) shows an exemplary ticket issue page displayed in step 414 (or step 614 of FIG. 6). This screen prompts the user to enter his password to determine whether the user has already received the ticket URL and the password. Different URLs and passwords may be provided for different events such as concerts. It is also practicable to notify the ticket URL and password not by e-mail but by use of a URL and password issued in an HTML page generated by a server such as a CGI (Common Gate Interface) server. In the present embodiment, the entity to which ticket data reservation is applied is separate from the other entity (URL) to which the user accesses for ticket issuance. It will be apparent that the ticket reservation and issue pages may be arranged on the same Web site and distinguished from one another by different passwords.

In step 501, the user portable terminal 103 inputs the password (the one notified by the mail message shown on FIG. 2(c)) through the display screen shown in FIG. 2(d). In step 502, the user portable terminal 103 checks if the ENTER button in the display screen has been pressed. In step 503, the user portable terminal 103 sends operational event data including the inputted password to the ticket issue server 101. In step 504, the ticket issue server 101 checks the received password. In step 505, if the password is found valid, the ticket issue server 101 sends the ticket data 113 to the user portable terminal 103. If the password is found invalid in step 505, then the ticket issue server 101 executes warning processing (for example, the ticket issue page is displayed again), upon which the ticket data acquisition processing comes to an end. In step 507, the user portable terminal 103 displays the received ticket data, upon which the ticket data acquisition processing comes to an end.

Figure 2E:
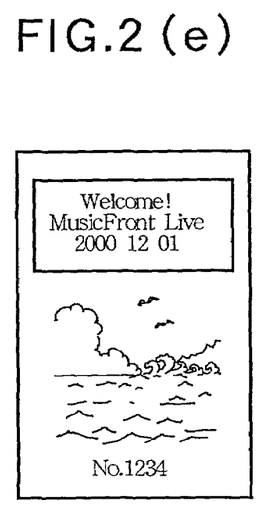
Figure 2F:
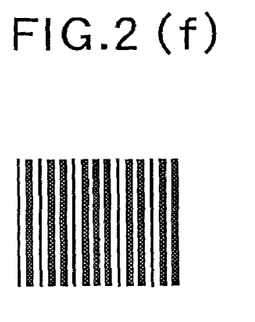

FIG. 2(e) shows exemplary ticket data displayed in step 507. In the figure, a design image (or a so-called icon) and a ticket issuance number ("No. 1234") are displayed in replacement of a physical ticket. Consequently, the event management can easily check the admission of the user by visually checking the image displayed on the user's portable terminal 103. The ticket data may also be displayed in the form of a bar code or text, in addition to the image shown in FIG. 2(e). FIG. 2(f) shows an exemplary display of a bar code. In the example, the bar code may be read by an image sensor, a bar code reader, or an OCR (Optical Character Reader) (equivalent to the I/F 161 shown in FIG. 1) for automatic machine-authentication. The event site management terminal 106 shown in FIG. 1 executes this machine authentication. It should be noted that the ticket data may be prepared for each individual event and each individual user as required.

The user authentication may also be realized by use of audio signals. For example, the ticket issue server 101 sends predetermined audio data to the user portable terminal 103 as ticket data, which is sounded from the user portable terminal 103 for admission checking. In addition, the ticket issue server may supply predetermined call terminating data to the user portable terminal 103 as ticket data, the call terminating data being sounded by the user at the time of entering the event site.

An input area may be arranged in the ticket display shown in FIG. 2(e) (step 616 of FIG. 6) into which the user inputs a predetermined password at the time of entering the event venue (step 618). The event administration checks a visible change in the display to determine the admission (steps 620, 622). In this case, the screen data having this input area and the data including a script which changes the display image when the predetermined password is inputted in the input area may be sent to the user portable terminal as ticket data (step 612). The password in this case may be supplied in the form of a numbered ticket given to visitors in the order of their arrival (step 610 of FIG. 6).

Figure 6:
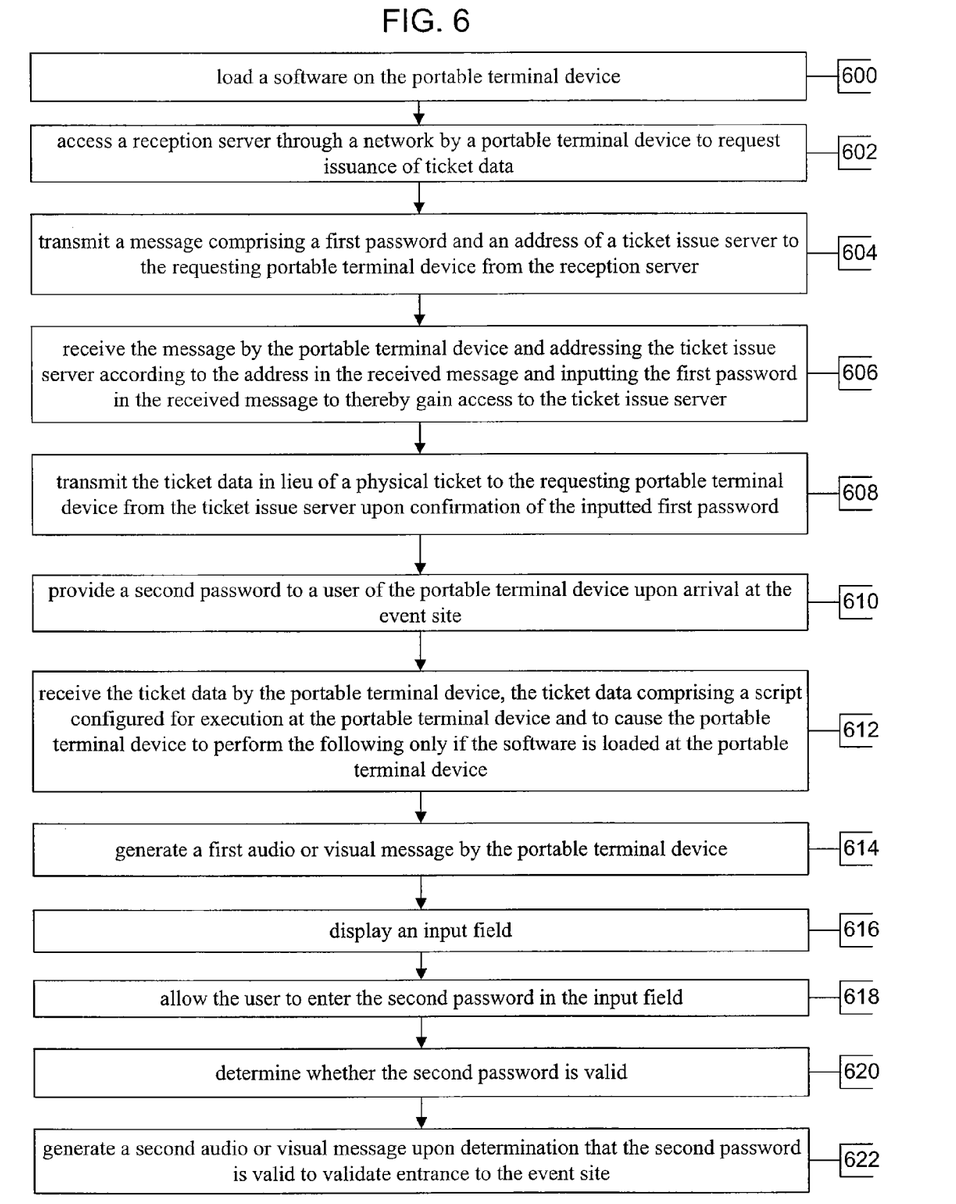
FIG. 6 is a flowchart describing a processing procedure to be executed at the acquisition of day ticket data.

Admission information in the form of numbers or character strings may be displayed on the monitor screen (step 414 of FIG. 4 or step 622 of FIG. 6). The event administration checks this admission information at the time of entering the venue to determine admission authentication. For example, when the admission information is inputted in the event site management terminal 106, the mobile telephone number of a corresponding registrant is called, the call terminating response of the mobile telephone being used for authentication.

In order to realize so-called day tickets sold on the day of the music performance, a particular URL separately specified at the event site may be accessed to provide the ticket authentication display for only the permitted number of first comers (steps 610, 614-622 of FIG. 6). The display screen may be of a format compliant with particular software to disable the displaying of screens unless such software is installed (steps 600 and 612 of FIG. 6) and unless the user is registered, thereby enhancing the reliability of authentication. In addition, in order to make the authentication more secure, a time stamp, a ticket display version number, or an issue number may be attached to each display screen.

In the above-mentioned embodiment, one ticket issue server 101 executes both the ticket data reservation from users and the ticket issuance (by use of different URLs). It will be apparent that these jobs may be executed separately by a reservation acceptance server and a ticket issue server.

In the above-mentioned embodiment, the mobile telephone is used as an example of the portable terminal device. It will be apparent that PDAs (Personal Digital Assistants) or other mobile devices may also be used.

In the above-mentioned embodiment, the ticket data reservation is made by use of mobile telephones. It will be apparent that each user may reserve tickets by use of a network-connected terminal set at home for example. In this case, the network-connected terminal sends the information for identifying a portable terminal for receiving the reserved request ticket data along with the reservation information to the server, which sends back the ticket data to the identified portable terminal.

As described and according to the invention, a portable terminal accesses an ticket issue server via a network to reserve ticket data, the ticket issue server sends back the requested ticket data, and the portable terminal presents the received ticket data visually or auditorily, thereby replacing a physical ticket. Consequently, each user can reserve the admission to an event without getting a physical ticket, which would usually require cumbersome procedures. The novel constitution also saves the event management from the labor and cost, which would be otherwise involved in the issuance of physical tickets. Further, the novel constitution significantly facilitates admission checking management with the aid of the visible or audible output on the portable terminal of each user.

While the preferred embodiments of the present invention have been described using specific terms, such description is for illustrative purposes only, and it is to be understood that changes and variations may be made without departing from the spirit or scope of the appended claims.

What is claimed is:

1. A method of validating an entrance to an event site, comprising the steps of:
    loading a software on the portable terminal device;
    accessing a reception server through a network by a portable terminal device to request issuance of ticket data;
    transmitting a message comprising a first password and an address of a ticket issue server to the requesting portable terminal device from the reception server;
    receiving the message by the portable terminal device and addressing the ticket issue server according to the address in the received message and inputting the first password in the received message to thereby gain access to the ticket issue server;
    transmitting the ticket data in lieu of a physical ticket to the requesting portable terminal device from the ticket issue server upon confirmation of the inputted first password;
    providing a second password to a user of the portable terminal device upon arrival at the event site; and
    receiving the ticket data by the portable terminal device, the ticket data comprising a script configured for execution at the portable terminal device and to cause the portable terminal device to perform the following only if the software is loaded at the portable terminal device:
        generate a first audio or visual message by the portable terminal device, display an input field;
        allow the user to enter the second password in the input field;
        determine whether the second password is valid; and
        generate a second audio or visual message upon determination that the second password is valid to validate entrance to the event site.

2. The method according to claim 1, further comprising examining the first and second messages to determine whether or not the ticket data is authentic.

* * * * *